United States Patent
Fujiwara

(10) Patent No.: US 9,796,353 B2
(45) Date of Patent: Oct. 24, 2017

(54) SIDE AIRBAG DEVICE FOR REAR SEAT

(71) Applicant: Toyota Jidosha Kabushiki Kaisha, Toyota-shi, Aichi-ken (JP)

(72) Inventor: Yusuke Fujiwara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/238,148

(22) Filed: Aug. 16, 2016

(65) Prior Publication Data

US 2017/0072900 A1 Mar. 16, 2017

(30) Foreign Application Priority Data

Sep. 11, 2015 (JP) ................................ 2015-179827

(51) Int. Cl.
*B60R 21/207* (2006.01)
*B60R 21/2155* (2011.01)
*B60R 21/231* (2011.01)

(52) U.S. Cl.
CPC .... *B60R 21/23138* (2013.01); *B60R 21/2155* (2013.01); *B60R 2021/2078* (2013.01); *B60R 2021/23146* (2013.01); *B60R 2021/23153* (2013.01)

(58) Field of Classification Search
CPC .. B60R 2021/2078; B60R 2021/23153; B60R 2021/23146; B60R 2021/161; B60R 21/23138; B60R 21/2155
See application file for complete search history.

(56) References Cited

U.S. PATENT DOCUMENTS

| | | | | |
|---|---|---|---|---|
| 5,564,735 A | * | 10/1996 | Boy | B60R 21/21 280/730.2 |
| 5,636,862 A | * | 6/1997 | Cheung | B60R 21/207 280/730.2 |
| 5,927,749 A | * | 7/1999 | Homier | B60N 2/5883 280/728.3 |
| 6,302,431 B1 | * | 10/2001 | Sasaki | B60R 21/207 280/728.2 |
| 6,341,797 B1 | * | 1/2002 | Seo | B60R 21/207 280/728.3 |
| 7,798,519 B2 | * | 9/2010 | Kawabe | B60R 21/207 280/728.3 |

(Continued)

FOREIGN PATENT DOCUMENTS

| | | |
|---|---|---|
| JP | 2006-088774 A | 4/2006 |
| JP | 2006-088850 A | 4/2006 |

(Continued)

*Primary Examiner* — Laura Freedman
(74) *Attorney, Agent, or Firm* — Dinsmore & Shohl LLP

(57) ABSTRACT

There is provided a side airbag device for a rear seat, the side airbag including (i) a side airbag that is provided between a vehicle body and a side portion of a seatback of a rear seat, and at least a portion of the side airbag is disposed further toward a vehicle lower side than a top surface of an armrest, and the side airbag is expanded at a side of a passenger at a time of a collision, and (ii) an airbag door garnish that covers the side airbag from a vehicle cabin side, and that has a door portion that, due to inflation pressure of the side airbag, opens toward a vehicle front side and a vehicle transverse direction outer side and abuts the armrest.

6 Claims, 5 Drawing Sheets

(56) References Cited

U.S. PATENT DOCUMENTS

| | | | |
|---|---|---|---|
| 8,534,701 B2* | 9/2013 | Sosnowski | B60R 21/20 180/65.21 |
| 8,646,562 B2* | 2/2014 | Fukawatase | B60N 2/4235 180/274 |
| 8,651,515 B2* | 2/2014 | Baba | B60R 21/233 280/729 |
| 8,651,518 B2* | 2/2014 | Shamoto | B60N 2/289 280/730.2 |
| 9,545,892 B2* | 1/2017 | Zimmermann | B60R 21/207 |
| 9,731,675 B2* | 8/2017 | Sadr | B60R 21/23138 |
| 2006/0061073 A1 | 3/2006 | Naruse et al. | |
| 2014/0284907 A1 | 9/2014 | Akiyama | |
| 2017/0021793 A1* | 1/2017 | Ito | B60N 2/015 |
| 2017/0066400 A1* | 3/2017 | Fujiwara | B60R 21/217 |
| 2017/0066402 A1* | 3/2017 | Fujiwara | B60R 21/231 |
| 2017/0072894 A1* | 3/2017 | Fujiwara | B60R 21/231 |

FOREIGN PATENT DOCUMENTS

| | | | |
|---|---|---|---|
| JP | 2009113594 A | * | 5/2009 |
| JP | 2009-143379 A | | 7/2009 |
| JP | 2009-255706 A | | 11/2009 |
| JP | 2010-247800 A | | 11/2010 |
| JP | 2014162391 A | * | 9/2014 |
| JP | 2014-184805 A | | 10/2014 |

\* cited by examiner

SIDE AIRBAG DEVICE FOR REAR SEAT

CROSS-REFERENCE TO RELATED APPLICATION

This application claims priority under 35 USC 119 from Japanese Patent Application No. 2015-179827 filed on Sep. 11, 2015, the disclosure of which is incorporated by reference herein.

BACKGROUND

Technical Field

The present disclosure relates to a side airbag device for a rear seat.

Related Art

Japanese Patent Application Laid-Open (JP-A) No. 2006-88774 discloses a side airbag device for a rear seat that includes, between the vehicle body and the side portion of a seatback for a rear seat, a side airbag, and an airbag door (airbag door garnish) that covers the side airbag from the vehicle cabin side. Further, the airbag door is structured so as to open toward the vehicle front side and the vehicle transverse direction outer side due to inflation pressure of the side airbag.

In a structure that protects the lumbar region and the abdominal region of a passenger by a side airbag, the lower portion of the side airbag is disposed further toward the vehicle lower side than the top surface of the armrest of the rear side door. Therefore, there are often cases in which the lower portion of the side airbag is disposed at a position that overlaps with the armrest as seen in a vehicle front view, or at a position that is in a vicinity of the armrest. In such a case, there is the concern that the side airbag will enter into the space between the airbag door garnish and the door trim. In particular, in a case in which the door trim enters into the vehicle cabin side due to a side collision or the like, expanding of the side airbag is impeded, and it would be difficult to expand the side airbag at a predetermined position.

SUMMARY

The present disclosure provides a side airbag device for a rear seat that can expand a side airbag at a predetermined position, in a structure in which at least a portion of the side airbag is disposed further toward the vehicle lower side than the top surface of an armrest.

A first aspect of the present disclosure is a side airbag device for a rear seat, including (i) a side airbag that is provided between a vehicle body and a side portion of a seatback of a rear seat, the side airbag being formed such that at least a portion of the side airbag is disposed further toward a vehicle lower side than a top surface of an armrest, and the side airbag is expanded at a side of a passenger at a time of a collision, and (ii) an airbag door garnish that covers the side airbag from a vehicle cabin side, and that has a door portion that, due to inflation pressure of the side airbag, opens toward a vehicle front side and a vehicle transverse direction outer side and abuts the armrest.

In the side airbag device for a rear seat relating to the above-described first aspect, at least a portion of the side airbag is disposed further toward the vehicle lower side than the top surface of the armrest. Further, the side airbag is covered from the vehicle cabin side by the airbag door garnish. Here, the airbag door garnish has a door portion that opens due to the inflation pressure of the side airbag, and this door portion opens toward the vehicle front side and the vehicle transverse direction outer side and abuts the armrest. Due thereto, at the time of expansion of the side airbag, the space between the airbag door garnish and the door trim is blocked by the door portion, and the side airbag entering into this space can be suppressed.

As described above, in accordance with the first aspect of the present disclosure, in a structure in which at least a portion of the side airbag is disposed further toward the vehicle lower side than the top surface of the armrest, the side airbag can be expanded at a predetermined position.

In a second aspect of the present disclosure, the door portion is structured to include a reverse-opening door portion that opens toward the vehicle front side and a vehicle transverse direction inner side due to inflation pressure of the side airbag.

In the side airbag device for a rear seat relating to the above-described second aspect, the side airbag being expanded toward the vehicle transverse direction inner side (the passenger side) can be suppressed by the reverse-opening door portion. Due thereto, the performance of reducing the potential of harm to a passenger who is at an improper position (the so-called out-of-position (OoP) performance) can be ensured. Namely, even in a state in which a passenger exists further toward the vehicle transverse direction outer side than the proper position at the time of a collision such as a side collision or the like, contact between the side airbag that is in the midst of expanding and the passenger who is at an improper position can be avoided or suppressed due to expansion of the side airbag toward the passenger side being suppressed by the reverse-opening door portion.

In a third aspect of the present disclosure, the reverse-opening door portion is provided further toward a vehicle upper side than the top surface of the armrest.

In the side airbag device for a rear seat relating to the above-described third aspect, the reverse-opening door portion opens toward the vehicle front side and the vehicle transverse direction inner side, at further toward the vehicle upper side than the top surface of the armrest. Due thereto, the upper portion of the side airbag being expanded toward an improper position at the vehicle transverse direction inner side is suppressed. The potential of harm to the chest portion in particular can be reduced.

In a fourth aspect of the present disclosure, the reverse-opening door portion is provided further toward the vehicle transverse direction inner side than the armrest.

In the side airbag device for a rear seat relating to the above-described fourth aspect, the reverse-opening door portion opens toward the vehicle front side and the vehicle transverse direction inner side, at further toward the vehicle transverse direction inner side than the armrest. Due thereto, the side airbag being expanded toward an improper position at the vehicle transverse direction inner side is suppressed, and the OoP performance can be ensured. Further, the reverse-opening door portion can be provided from the upper end portion to the lower end portion of the door portion, and expansion toward an improper position can be suppressed over the entire region from the upper portion to the lower portion of the side airbag.

In accordance with the second through fourth aspects of the present disclosure, the OoP performance can be ensured.

In a fifth aspect of the present disclosure, at least a portion of the door portion is provided at a position that, as seen in a vehicle front view, overlaps a webbing that is in a non-applied state.

In the side airbag device for a rear seat relating to the above-described fifth aspect, at the time when the door portion opens due to the inflation pressure of the side airbag, the webbing that is in a non-applied state hits the door portion and is moved. Due thereto, the webbing that is in the non-applied state can be set far from the locus of expansion of the side airbag. As a result, the side airbag, that is in the midst of expanding, contacting the webbing that is in the non-applied state is suppressed, and the side airbag can be expanded at a predetermined position.

In accordance with the fifth aspect of the present disclosure, the expansion performance of the side airbag can be improved.

In a sixth aspect of the present disclosure, (i) the side airbag is accommodated in a case together with an inflator that supplies gas to the side airbag, and (ii) the case has a bottom wall that supports, from a vehicle rear side, the side airbag that is in an expanded state, and (iii) an inclined surface, that is inclined toward a vehicle front side on progression toward a vehicle lower side with respect to a general portion of the bottom wall, is formed at the bottom wall at further toward a vehicle lower side than the top surface of the armrest.

In the side airbag device for a rear seat relating to the above-described sixth aspect, gas generated from the inflator can be made to flow along the inclined surface toward the vehicle front side and the vehicle lower side, and the lower portion of the side airbag can be expanded rapidly.

In accordance with the sixth aspect of the present disclosure, the lower portion of the side airbag can be expanded at a predetermined position, even at the time of a collision such as a side collision or the like in which the door trim enters into the vehicle cabin side.

BRIEF DESCRIPTION OF THE DRAWINGS

Exemplary embodiments of the present disclosure will be described in detail based on the following figures, wherein.

DETAILED DESCRIPTION

First Embodiment

A side airbag device for a rear seat relating to a first embodiment is described with reference to FIGS. 1 through 3. Note that arrow FR that is shown appropriately in these drawings indicates the vehicle front side, arrow UP indicates the vehicle upper side, and arrow RH indicates the vehicle right side when facing in the advancing direction. Further, when longitudinal, up-down and left-right directions are used in the following description without being specified, they mean the longitudinal of the vehicle longitudinal direction, up-down of the vehicle vertical direction, and left and right when facing in the advancing direction.

Figure 1:
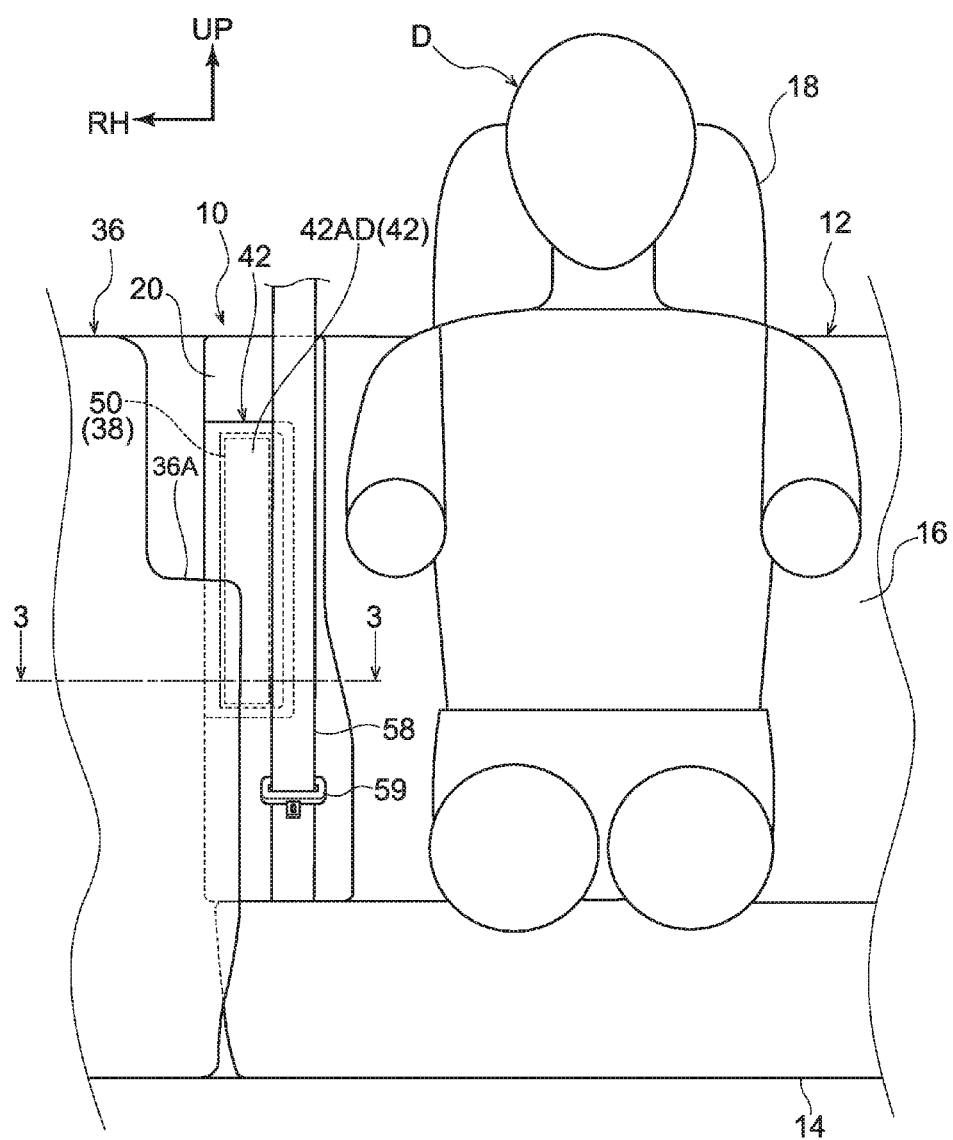
FIG. 1 is a front view showing a rear seat to which a side airbag device for a rear seat relating to a first embodiment is applied.

A front view in which a rear seat 12, to which a side airbag device 10 for a rear seat relating to the present embodiment is applied, is seen from the vehicle front surface side is shown in FIG. 1. Further, FIG. 1 illustrates a state in which a crash test dummy (mannequin) is seated on a seat cushion 14 of the rear seat 12 as a model of a passenger who is to be protected. The dummy is, for example, an AM50 (50th percentile U.S. adult male) World SID (internationally standardized side crash dummy: World Side Impact Dummy). This dummy is seated in a standard seated posture that is prescribed by the crash test method, and the rear seat 12 is positioned at a standard set position that corresponds to this seated posture. Hereinafter, in order to make the explanation easy to understand, the dummy is called the "passenger D".

As shown in FIG. 1, the rear seat 12 is structured to include the seat cushion 14 and a seatback 16. A headrest 18 for supporting the head portion of the passenger D is provided at the upper end portion of the seatback 16. Further, a webbing (belt) 58 for restraining the passenger D is disposed at the side of the passenger D. The webbing 58 extends in the vehicle vertical direction. One end portion of the webbing 58 is fixed to an unillustrated belt anchor that is mounted to the vehicle floor. On the other hand, the other end portion of the webbing 58 is wound on an unillustrated retractor that is installed at an upper back panel. Moreover, the webbing 58 is inserted-through a tongue plate 59 that is to be attached to an unillustrated buckle.

Here, side garnishes 20 are provided at the vehicle transverse direction both sides of the seatback 16 of the rear seat 12. The side airbag devices 10 for a rear seat are assembled to the side garnishes 20. Note that FIG. 1 shows only the side garnish 20 and the side airbag device 10 for a rear seat that are at the vehicle right side of the seatback 16, but the side garnish 20 and the side airbag device 10 for a rear seat are similarly provided at the vehicle left side of the seatback 16 as well. Further, because the side airbag device 10 for a rear seat that is at the vehicle right side and the side airbag device 10 for a rear seat that is at the vehicle left side are symmetrical to the left and the right, only the side airbag device 10 for a rear seat that is at the vehicle right side is described in the following description.

Figure 3:
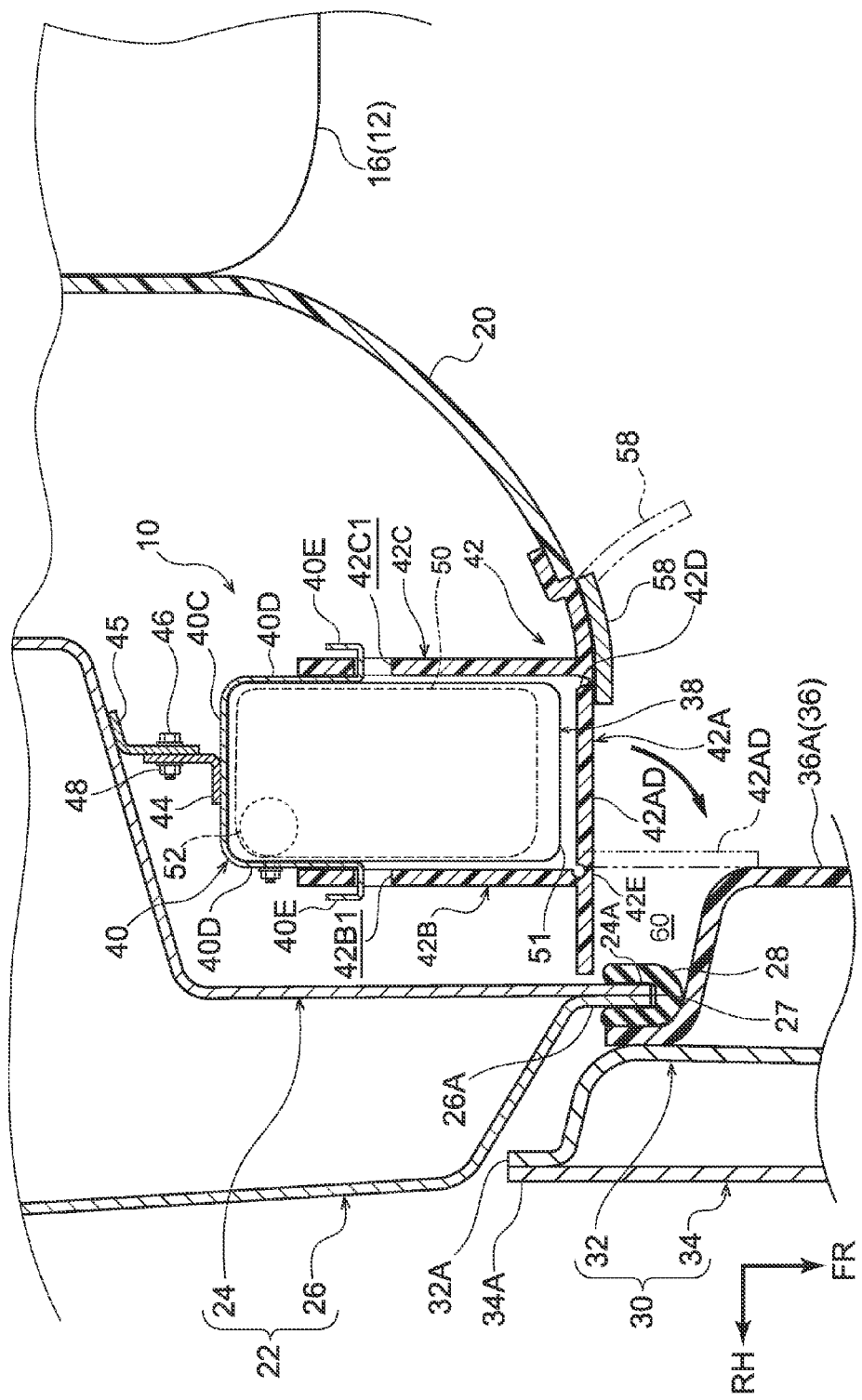
FIG. 3 is an enlarged sectional view showing, in an enlarged manner, the state cut along line 3-3 of FIG. 1.

As shown in FIG. 3, the side garnish 20 is provided between the side of the seatback 16 and a wheel house 22 that serves as a vehicle body, and the side garnish 20 is formed of resin. Further, the side airbag device 10 for a rear seat is assembled to the end portion at the vehicle right side (the vehicle transverse direction outer side) of the side garnish 20. The side airbag device 10 for a rear seat is described later.

The wheel house 22 is structured to include a wheel house inner panel 24 that structures an inner plate, and a wheel house outer panel 26 that structures an outer plate. Further, the wheel house inner panel 24 extends in the vehicle longitudinal direction along the side portion at the vehicle right side of the side airbag device 10 for a rear seat, and bulges-out toward the vehicle left side (the vehicle transverse direction inner side) at further toward the vehicle rear side than the side airbag device 10 for a rear seat. Further, an inner side flange 24A is formed at the front end portion of the wheel house inner panel 24.

The wheel house outer panel 26 extends in the vehicle longitudinal direction at the vehicle right side of the wheel house inner panel 24, and a closed cross-section is structured between the wheel house outer panel 26 and the wheel house inner panel 24. Further, an outer side flange 26A is formed along the inner side flange 24A, at the front end portion of the wheel house outer panel 26. The inner side flange 24A and the outer side flange 26A are joined together and structure the rear edge of a door opening 27. Further, a weather strip 28 is mounted to the joined portion of the inner side flange 24A and the outer side flange 26A.

A rear side door 30 is disposed further toward the vehicle front side than the wheel house 22. The rear side door 30 is structured to include a door inner panel 32 that structures an inner plate, and a door outer panel 34 that structures an outer plate. Further, an inner side flange 32A, that is formed at the peripheral edge of the door inner panel 32, and an outer side flange 34A, that is formed at the peripheral edge of the door outer panel 34, are joined together. Further, a door trim 36, that is made of resin and that is an interior fitting part, is mounted to the vehicle left side of the door inner panel 32. An armrest 36A that juts-out toward the vehicle left side is provided at the door trim 36 (see FIG. 1).

The side airbag device 10 for a rear seat that is assembled to the side garnish 20 is structured to include an airbag module 38, a case 40 and an airbag door garnish 42 (hereinafter appropriately called "airbag door 42").

The airbag module 38 is disposed between the side portion of the seatback 16 and the wheel house 22, and is structured to include a side airbag 50 and an inflator 52. Further, as shown in FIG. 1, at least a portion of the side airbag 50 (the airbag module 38) is disposed at a position overlapping the armrest 36A as seen in a vehicle front view. Namely, at least a portion of the side airbag 50 is disposed further toward the vehicle lower side than the top surface of the armrest 36A.

As shown in FIG. 3, the side airbag 50 is formed in the shape of a bag, and, at the time of a collision, is expanded at the side of the passenger D and protects the passenger D. Further, the side airbag 50 of the present embodiment is wrapped, in a state of being folded-up, in a wrapping material 51 that breaks easily. Note that the way of folding the side airbag 50 is not limited, and the side airbag 50 may be folded-up in the form of bellows or in the form of a roll. Further, the side airbag 50 may be accommodated without being folded-up.

The inflator 52 is wrapped-up together with the side airbag 50 by the wrapping material 51. A combustion type inflator or a cold gas type inflator is employed as the inflator 52. The inflator 52 supplies gas, that is generated due to the inflator 52 being operated, to the side airbag 50 interior. In the present embodiment, the inflator 52 is made to be an inflator of a cylindrical form, and is disposed such that the length direction thereof is the vehicle vertical direction. Further, as shown in FIG. 2, plural gas jetting ports 52A are formed in the lower end portion of the inflator 52 along the peripheral surface thereof, and gas is jetted-out from the gas jetting ports 52A due to the inflator 52 being operated.

Moreover, a diffuser 53 that is a flow regulating cloth is disposed at the periphery of the inflator 52. The diffuser 53 is formed substantially in the shape of a tube whose both end portions are open, and is structured so as to make the gas, that is generated from the inflator 52, flow toward the vehicle upper side and the vehicle lower side. Further, the inflator 52 is electrically connected to an unillustrated Electronic Control Unit (ECU) that is a control section, and is operated by the ECU at the time of a collision of the vehicle.

The case 40 that houses the airbag module 38 is formed in the shape of a box whose vehicle front side is open. An upper wall 40A and a lower wall 40B are provided at the upper end portion and the lower end portion of the case 40, respectively. The upper wall 40A is disposed at the vehicle upper side of the airbag module 38 and structures the upper surface of the case 40. The lower wall 40B is disposed at the vehicle lower side of the airbag module 38 and structures the lower surface of the case 40.

A bottom wall 40C, that connects the rear ends of the upper wall 40A and the lower wall 40B, is provided at the vehicle rear side of the airbag module 38 at the case 40. This bottom wall 40C is structured so as to support, from the vehicle rear side, the side airbag 50 that is in the expanded state. Further, as shown in FIG. 3, a pair of side walls 40D extend-out toward the vehicle front side from the vehicle transverse direction both end portions of the bottom wall 40C. The pair of side walls 40D are disposed so as to face one another with an interval therebetween in the vehicle transverse direction. Anchor claws 40E are formed at the side walls 40D respectively. The anchor claws 40E extend toward the outer sides from the front end edges of the side walls 40D, and are further bent toward the vehicle rear side. Therefore, the anchor claw 40E is formed in a substantial L-shape (a substantial J-shape) as seen in a vehicle plan view. Further, the anchor claws 40E are anchored on the airbag door 42.

An L-shaped bracket 44 is joined to the vehicle rear side surface of the bottom wall 40C of the case 40. On the other hand, an L-shaped bracket 45 is joined to the wheel house inner panel 24 as well. The L-shaped bracket 44 at the case 40 side and the L-shaped bracket 45 at the wheel house inner panel 24 side are fastened-together via a bolt 46 and a nut 48. Due thereto, the case 40 is fixed to the wheel house 22.

Figure 2:
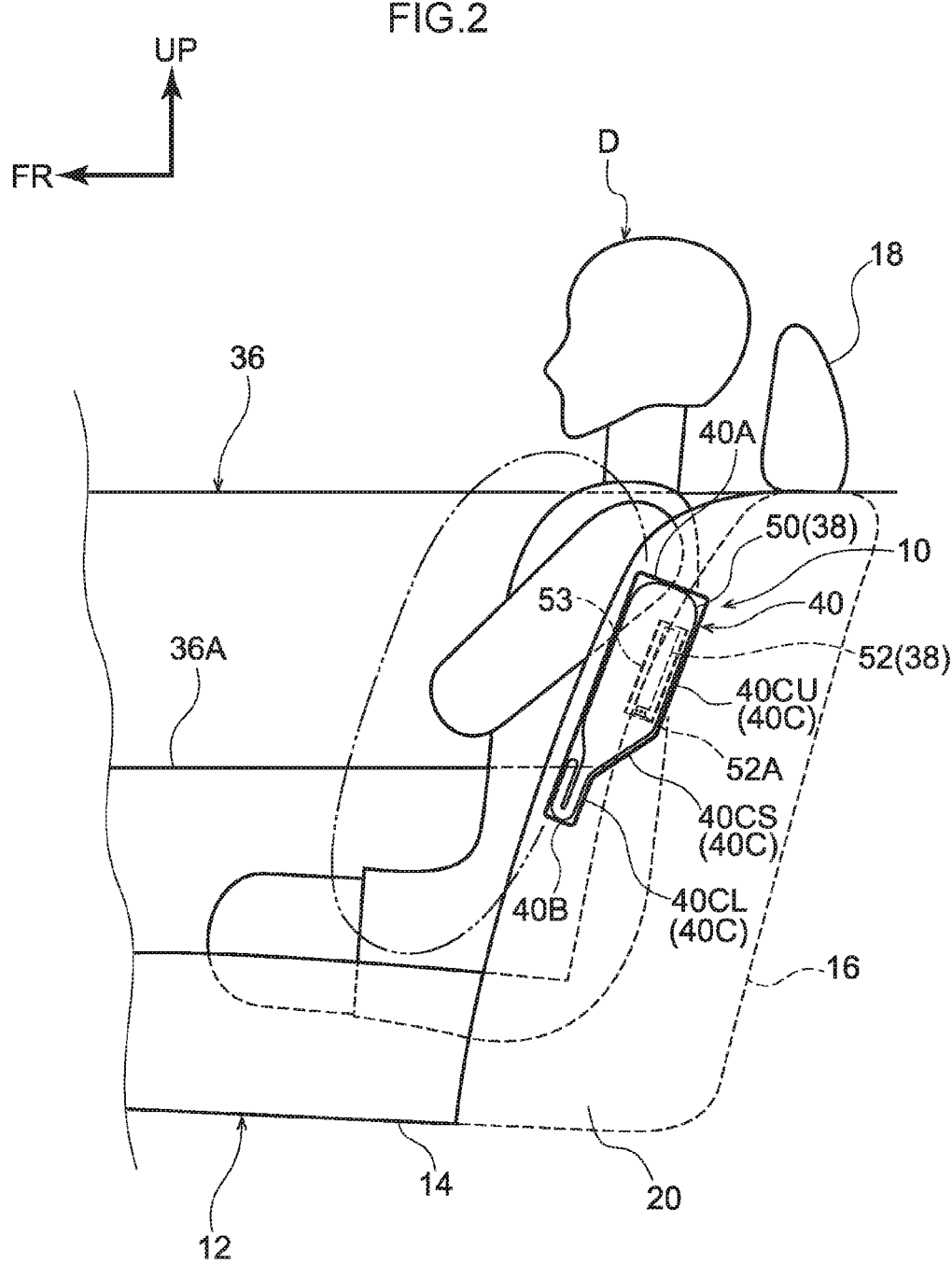
FIG. 2 is a side view of FIG. 1 in which the rear seat, to which the side airbag device for a rear seat relating to the first embodiment is applied, is seen from a seat transverse direction outer side.

As shown in FIG. 2, an inclined surface 40CS is formed at the lower portion of the bottom wall 40C. The inclined surface 40CS is formed at a position that is offset further toward the vehicle upper side than the lower end of the case 40, and is formed at the vehicle lower side of the inflator 52. Further, the inclined surface 40CS is inclined toward the vehicle front side while heading toward the vehicle lower side, with respect to a general portion 40CU of the bottom wall 40C. A region 40CL, that is further toward the vehicle lower side than the inclined surface 40CS at the bottom wall 40C, is positioned at the vehicle front side as compared with the general portion 40CU that is further toward the vehicle upper side than the inclined surface 40CS at the bottom wall 40C. Further, the side airbag 50 that is accommodated in the case 40 is folded-up in the longitudinal direction, and is folded-over toward the vehicle front side at the region 40CL that is further toward the vehicle lower side than the inclined surface 40CS at the bottom wall 40C.

The inclined surface 40CS is formed at a position that overlaps the top surface of the armrest 36A of the rear side door 30 as seen in a vehicle side view, or is formed further toward the vehicle lower side than the top surface of the armrest 36A. Namely, the lower end portion of the inclined surface 40CS is positioned further toward the vehicle lower side than the top surface of the armrest 36A as seen in a vehicle side view.

As shown in FIG. 3, the airbag door 42 is disposed at the vehicle front side of the case 40, and the airbag module 38 is covered from the vehicle cabin side by this airbag door 42.

The airbag door 42 is structured to include a lateral wall portion 42A that extends in the vehicle transverse direction as seen in a vehicle plan sectional view, and a vertical wall portion 42B and a vertical wall portion 42C that extend-out toward the vehicle rear side from the lateral wall portion 42A. The vertical wall portion 42B and the vertical wall portion 42C are disposed so as to face one another in the vehicle transverse direction. The vertical wall portion 42B extends-out toward the vehicle rear side from further toward the vehicle right side than the vehicle transverse direction central portion of the lateral wall portion 42A. On the other hand, the vertical wall portion 42C extends-out toward the vehicle rear side from further toward the vehicle left side than the vehicle transverse direction central portion of the lateral wall portion 42A.

Here, an anchor hole 42B1 is formed in the vertical wall portion 42B, and the anchor claw 40E that is formed at the side wall 40D of the case 40 is anchored on this anchor hole 42B1. Further, an anchor hole 42C1 is formed in the vertical wall portion 42C, and the anchor claw 40E that is formed at the side wall 40D of the case 40 is anchored on this anchor hole 42C1.

The lateral wall portion 42A extends in the vehicle transverse direction between the side garnish 20 and the wheel house inner panel 24. Further, the lateral wall portion 42A is formed in a substantially rectangular shape whose length direction is the vehicle vertical direction, as seen in a vehicle front view (see FIG. 1).

Moreover, a tear portion 42D that is thin-walled is formed at the root portion of the vertical wall portion 42C at the lateral wall portion 42A. This tear portion 42D is a planned breakage portion that breaks due to the inflation pressure of the side airbag 50. Moreover, a hinge portion 42E that is thin-walled is formed at the root portion of the vertical wall portion 42B at the lateral wall portion 42A. This hinge portion 42E is formed such that the thickness thereof is thicker than that of the tear portion 42D.

Here, the portion between the tear portion 42D and the hinge portion 42E at the lateral wall portion 42A is a door portion 42AD that opens due to the inflation pressure of the side airbag 50. Namely, if the tear portion 42D breaks at the time of inflation and expansion of the side airbag 50, the hinge portion 42E becomes a hinge, and the door portion 42AD opens toward the vehicle front side and the vehicle transverse direction outer side around the hinge portion 42E. Then, the door portion 42AD abuts the armrest 36A of the door trim 36 (refer to the two-dot chain line in FIG. 3). Due thereto, a space 60 between the door opening 27 and the door trim 36 is blocked by the door portion 42AD.

Further, as shown in FIG. 1, at least a portion of the door portion 42AD is provided at a position that overlaps the webbing 58 that is in a non-applied state, as seen in a vehicle front view. As shown in FIG. 3, in the present embodiment, the webbing 58 that is in a non-applied state contacts the airbag door 42, and the distal end portion (the tear portion 42D side) of the door portion 42AD overlaps the webbing 58 in the vehicle transverse direction.

(Operation)

Operation of the side airbag device for a rear seat relating to the present embodiment is described next.

The door portion 42AD that opens due to the inflation pressure of the side airbag 50 is provided at the airbag door 42 of the present embodiment. The door portion 42AD opens toward the vehicle front side and the vehicle transverse direction outer side, and abuts the armrest 36A. Due thereto, at the time of expansion of the side airbag 50, the space 60 between the airbag door 42 and the door trim 36 is blocked by the door portion 42AD, and the side airbag 50 entering into this space 60 can be suppressed.

In particular, in the present embodiment, there is a structure in which at least a portion of the side airbag 50 is disposed further toward the vehicle lower side than the top surface of the armrest 36A. Further, as seen in a vehicle front view, the side airbag 50 is disposed at a position that overlaps the armrest 36A, or at a position that is adjacent to the armrest 36A. Even in such a structure, the side airbag 50 being expanded into the space 60 can be suppressed due to the space 60 between the airbag door 42 and the door trim 36 being blocked by the door portion 42AD. As a result, the side airbag 50 can be expanded at a predetermined position.

Further, in the present embodiment, as shown in FIG. 3, the distal end of the door portion 42AD is provided at a position that overlaps, in the vehicle transverse direction, the webbing 58 that is in a non-applied state. Due thereto, after the door portion 42AD opens toward the vehicle front side and the vehicle transverse direction outer side due to the inflation pressure of the side airbag 50, the webbing 58 is hit by the door portion 42AD and is moved toward the vehicle transverse direction inner side (refer to the two-dot chain line in the drawing). Due thereto, the webbing 58 that is in the non-applied state can be set far from the locus of expansion of the side airbag 50. As a result, the side airbag 50, that is in the midst of expanding, contacting the webbing 58 that is in the non-applied state is suppressed, and the side airbag 50 can be expanded at a predetermined position. Namely, the expansion performance of the side airbag 50 can be improved.

Moreover, in the present embodiment, as shown in FIG. 2, the inclined surface 40CS is formed at the bottom wall 40C of the case 40. Due thereto, the gas that is generated from the inflator 52 can be made to flow toward the vehicle front side and the vehicle lower side along the inclined surface 40CS, and the lower portion of the side airbag 50 can be expanded rapidly. As a result, even at the time of a collision such as a side collision or the like in which the door trim 36 enters into the vehicle cabin side, the lower portion of the side airbag 50 can be expanded at a predetermined position.

Further, in the present embodiment, the lower portion of the side airbag 50 is folded-over toward the vehicle front side. Due thereto, after gas is supplied from the inflator 52, the folded-over region of the side airbag 50 is opened toward the vehicle front side by the expansion pressure, and the lower portion of the side airbag 50 can be expanded rapidly.

Second Embodiment

A side airbag device for a rear seat relating to a second embodiment is described next with reference to FIG. 4. Note that structures that are similar to those of the first embodiment are denoted by the same reference numerals, and description thereof is omitted as appropriate.

Figure 4:
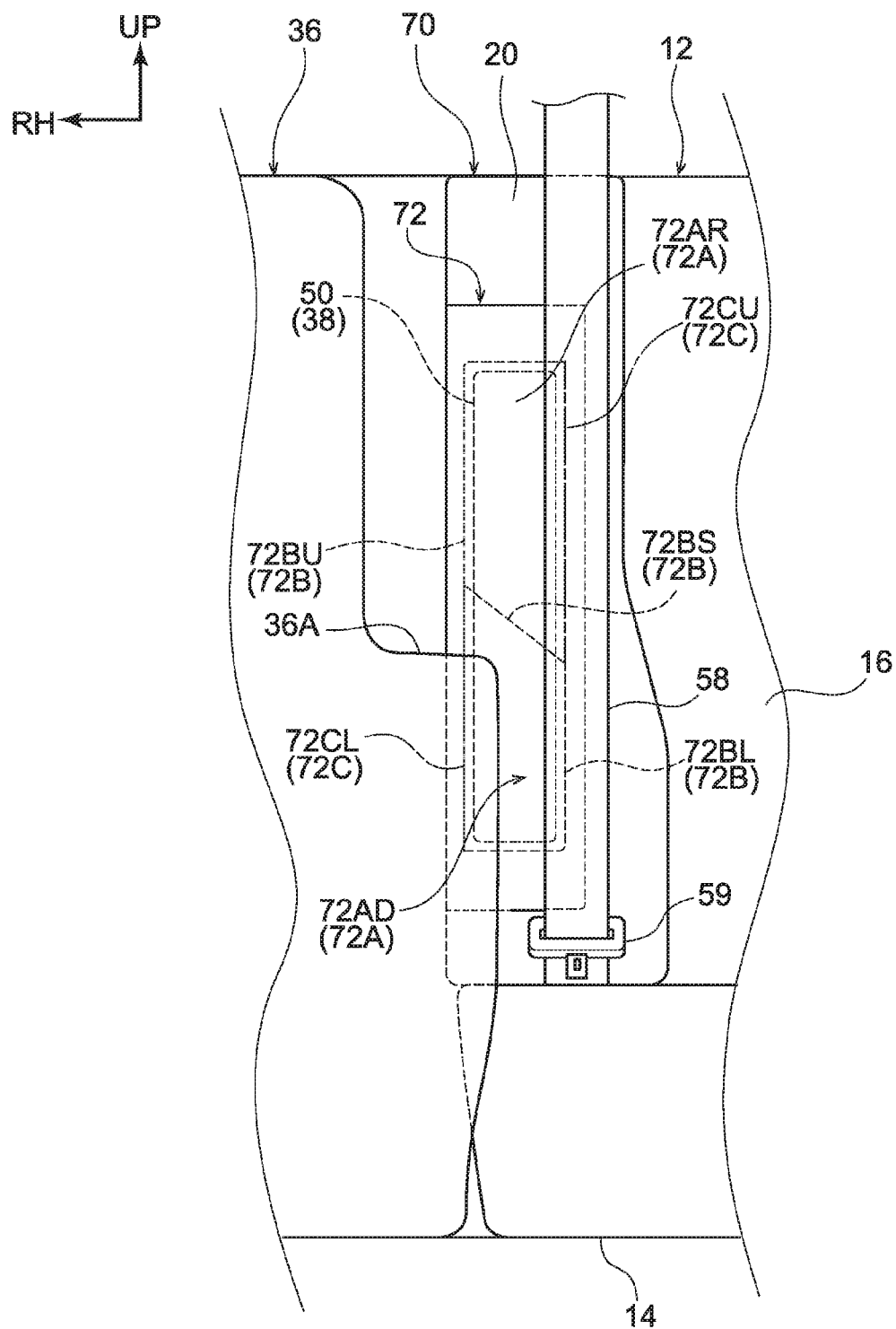
FIG. 4 is a front view showing, in an enlarged manner, a side airbag device for a rear seat relating to a second embodiment.

As shown in FIG. 4, at a side airbag device 70 for a rear seat of the present embodiment, an airbag door garnish 72 (hereinafter appropriately called "airbag door 72") is assembled to the side garnish 20. Further, the side airbag 50 is covered from the vehicle cabin side by this airbag door 72.

Here, the airbag door 72 has a lateral wall portion 72A that extends in the vehicle transverse direction as seen in a vehicle plan sectional view. A tear portion 72B and hinge portions 72C that are thin-walled are formed at the lateral wall portion 72A. The tear portion 72B and the hinge portions 72C are respectively formed in the rear surface of the airbag door 72. Further, the tear portion 72B is structured to include an upper side tear portion 72BU, a lower side tear portion 72BL, and an inclined tear portion 72BS.

The upper side tear portion 72BU is formed further toward the vehicle upper side than the top surface of the armrest 36A, and extends toward the vehicle upper side along the vehicle right side end portion of the airbag door 72 and is further bent toward the vehicle left side. Therefore, the upper side tear portion 72BU is formed in a substantial L-shape that is upside-down as seen in a vehicle front view.

The lower side tear portion 72BL is formed further toward the vehicle lower side than the top surface of the armrest 36A, and extends toward the vehicle lower side along the vehicle left side end portion of the airbag door 72 and is further bent toward the vehicle right side. Therefore, the lower side tear portion 72BL is formed in a substantial L-shape that is backwards as seen in a vehicle front view.

The inclined tear portion 72BS connects the lower end of the upper side tear portion 72BU and the upper end of the lower side tear portion 72BL, and is inclined toward the vehicle lower side while heading from the lower end of the upper side tear portion 72BU toward the upper end of the lower side tear portion 72BL. Further, the lower end of the inclined tear portion 72BS is connected to the upper end of the lower side tear portion 72BL. The tear portion 72B is structured by forming the upper side tear portion 72BU, the inclined tear portion 72BS and the lower side tear portion 72BL continuously in this way.

On the other hand, the hinge portions 72C are structured to include an upper side hinge portion 72CU and a lower side hinge portion 72CL. The upper side hinge portion 72CU extends toward the vehicle lower side from the right end of the upper side tear portion 72BU to the lower end of the inclined tear portion 72BS. Further, the lower side hinge portion 72CL extends toward the vehicle lower side from the upper end of the inclined tear portion 72BS to the left end of the lower side tear portion 72BL.

Here, a region that is substantially rectangular as seen in a vehicle front view is formed by the upper side tear portion 72BU, the lower side tear portion 72BL, the upper side hinge portion 72CU and the lower side hinge portion 72CL, and this region is a door portion 72AD. Further, the portion, that is further toward the vehicle upper side than the inclined tear portion 72BS, at the door portion 72AD is a reverse-opening door portion 72AR.

The reverse-opening door portion 72AR is provided further toward the vehicle upper side than the top surface of the armrest 36A. Further, if the tear portion 72B breaks due to the inflation pressure of the side airbag 50, the reverse-opening door portion 72AR opens toward the vehicle front side and the vehicle transverse direction inner side around the upper side hinge portion 72CU. Further, if the tear portion 72B breaks due to the inflation pressure of the side airbag 50, the region, that is further toward the vehicle lower side than the reverse-opening door portion 72AR, at the door portion 72AD opens toward the vehicle front side and the vehicle transverse direction outer side around the lower side hinge portion 72CL.

Further, as seen in a vehicle front view, the upper side hinge portion 72CU and the lower side tear portion 72BL are provided at a position that overlaps the webbing 58 that is in the non-applied state.

(Operation)

Operation of the side airbag device for a rear seat relating to the present embodiment is described next.

In the present embodiment, the side airbag 50 being expanded toward the vehicle transverse direction inner side (the passenger side) can be suppressed by the reverse-opening door portion 72AR. Due thereto, the performance of reducing the potential of harm to a passenger who is at an improper position (the so-called out-of-position (OoP) performance) can be ensured. Namely, even in a state in which a passenger exists further toward the vehicle transverse direction outer side than the proper position at the time of a collision such as a side collision or the like, contact between the side airbag 50 that is in the midst of expanding and the passenger who is at an improper position can be avoided or suppressed due to expansion of the side airbag 50 toward the passenger side being suppressed by the reverse-opening door portion 72AR.

Further, in the present embodiment, because the reverse-opening door portion 72AR is provided further toward the vehicle upper side than the top surface of the armrest 36A at the door portion 72AD, the upper portion of the side airbag 50 being expanded toward the vehicle transverse direction inner side is suppressed. Due thereto, the potential of harm to the chest portion of the passenger in particular can be reduced. Moreover, because the reverse-opening door portion 72AR is not provided further toward the vehicle lower side than the top surface of the armrest 36A, the expansion of the lower portion of the side airbag 50 being impeded by the armrest 36A can be suppressed. Namely, the side airbag can be expanded at a predetermined position.

On the other hand, the region, that is further toward the lower side than the reverse-opening door portion 72AR, at the door portion 72AD opens toward the vehicle front side and the vehicle transverse direction outer side around the lower side hinge portion 72CL, and, due thereto, this region abuts the armrest 36A. Due thereto, at the time of expansion of the side airbag 50, the space between the airbag door 72 and the door trim 36 is blocked by the door portion 72AD, and the side airbag 50 entering into this space can be suppressed. Other operations are similar to those of the first embodiment.

Third Embodiment

A side airbag device for a rear seat relating to a third embodiment is described next with reference to FIG. 5. Note that structures that are similar to those of the first embodiment are denoted by the same reference numerals, and description thereof is omitted as appropriate.

Figure 5:
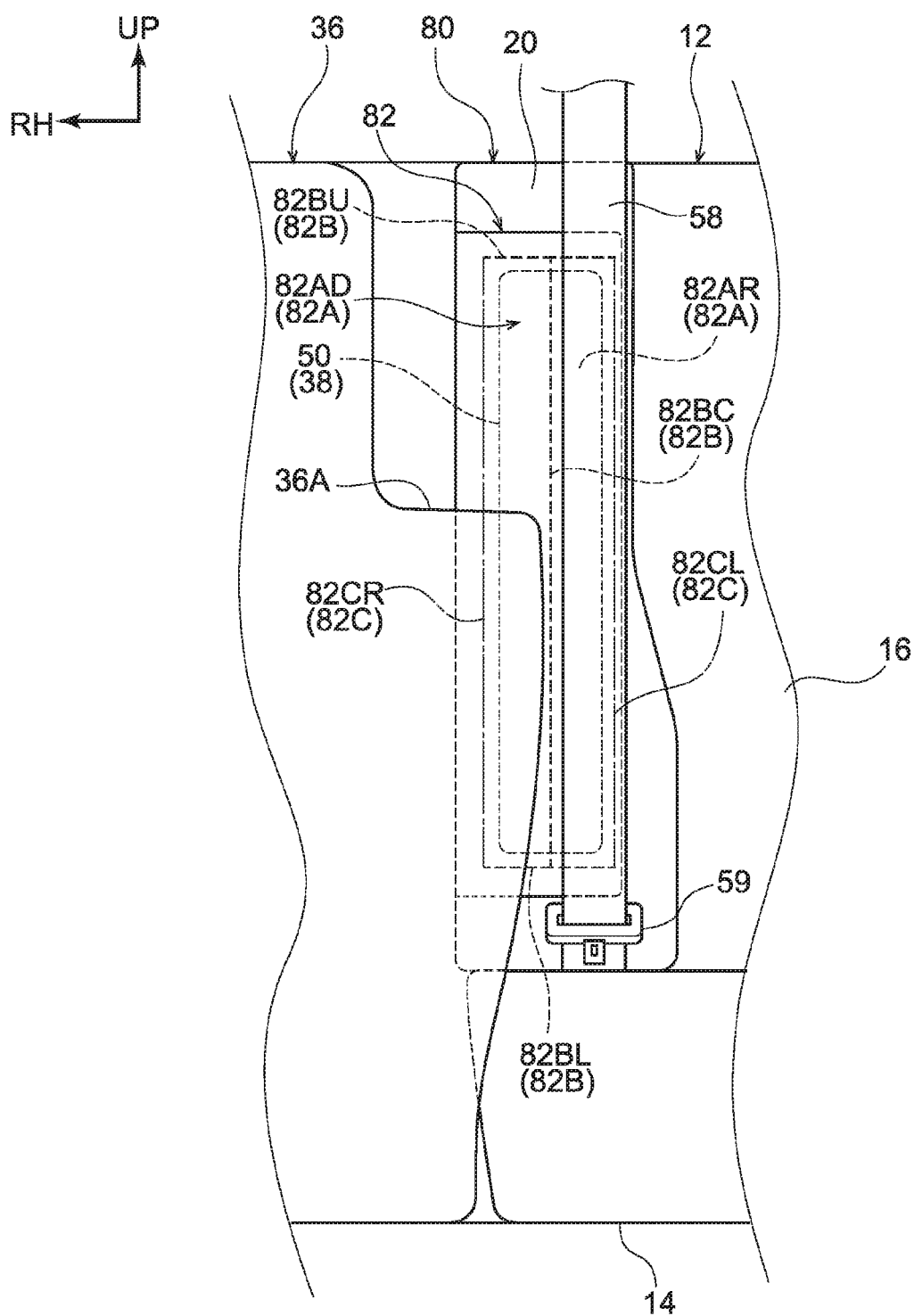
FIG. 5 is a front view showing, in an enlarged manner, a side airbag device for a rear seat relating to a third embodiment.

As shown in FIG. 5, at a side airbag device 80 for a rear seat of the present embodiment, an airbag door garnish 82 (hereinafter appropriately called "airbag door 82") is assembled to the side garnish 20. Further, the side airbag 50 is covered from the vehicle cabin side by this airbag door 82.

Here, the airbag door 82 has a lateral wall portion 82A that extends in the vehicle transverse direction as seen in a vehicle plan sectional view. A tear portion 82B and hinge portions 82C that are thin-walled are formed at the lateral wall portion 82A. The tear portion 82B and the hinge portions 82C are respectively formed in the rear surface of the airbag door 82. Further, the tear portion 82B is structured to include an upper side tear portion 82BU, a lower side tear portion 82BL, and a central tear portion 82BC.

The upper side tear portion 82BU extends in the vehicle transverse direction along the upper portion of the airbag door 82. Further, the lower side tear portion 82BL extends in the vehicle transverse direction along the lower portion of the airbag door 82. Moreover, the central tear portion 82BC extends in the vehicle vertical direction, and connects the central portions of the upper side tear portion 82BU and the lower side tear portion 82BL together.

On the other hand, the hinge portions 82C are structured to include a right side hinge portion 82CR and a left side hinge portion 82CL. The right side hinge portion 82CR extends in the vehicle vertical direction along the vehicle right side end portion of the airbag door 82, and the right side hinge portion 82CR connects the right ends of the upper side tear portion 82BU and the lower side tear portion 82BL together. Further, the left side hinge portion 82CL extends in the vehicle vertical direction along the vehicle left side end portion of the airbag door 82, and the left side hinge portion 82CL connects the left ends of the upper side tear portion 82BU and the lower side tear portion 82BL together.

Here, a region that is substantially rectangular as seen in a vehicle front view is formed by the upper side tear portion 82BU, the lower side tear portion 82BL, the right side hinge portion 82CR and the left side hinge portion 82CL, and this region is a door portion 82AD. Further, the portion, that is further toward the vehicle left side than the central tear portion 82BC, at the door portion 82AD is a reverse-opening door portion 82AR.

The reverse-opening door portion 82AR is provided further toward the vehicle transverse direction inner side than the armrest 36A. Further, if the tear portion 82B breaks due to the inflation pressure of the side airbag 50, the reverse-opening door portion 82AR opens toward the vehicle front side and the vehicle transverse direction inner side around the left side hinge portion 82CL. Further, if the tear portion 82B breaks due to the inflation pressure of the side airbag 50, the region, that is further toward the vehicle right side than the reverse-opening door portion 82AR, at the door portion 82AD opens toward the vehicle front side and the vehicle transverse direction outer side around the right side hinge portion 82CR.

Further, as seen in a vehicle front view, the reverse-opening door portion 82AR provided at a position that overlaps the webbing 58 that is in a non-applied state.

(Operation)

Operation of the side airbag device for a rear seat relating to the present embodiment is described next.

In the present embodiment, the reverse-opening door portion 82AR opens toward the vehicle front side and the vehicle transverse direction inner side, at further toward the vehicle transverse direction inner side than the armrest 36A. Due thereto, the side airbag 50 being expanded at the vehicle transverse direction inner side is suppressed, and the OoP performance can be ensured. Further, because the reverse-opening door portion 82AR is provided from the upper end portion to the lower end portion of the door portion 82AD, expansion toward an improper position can be suppressed over the entire region from the upper portion to the lower portion of the side airbag 50.

Moreover, in the present embodiment, the reverse-opening door portion 82AR is provided at a position that overlaps the webbing 58 as seen in a vehicle front view. Due thereto, at the time when the reverse-opening door portion 82AR opens, the webbing 58 can be moved toward the vehicle left side. Further, the webbing 58 returning toward the vehicle right side can be impeded by the reverse-opening door portion 82AR. Due thereto, the state in which the webbing 58 is kept far from the locus of expansion of the side airbag 50 can be maintained.

On the other hand, the region, that is further toward the vehicle right side than the reverse-opening door portion 82AR, at the door portion 82AD opens toward the vehicle front side and the vehicle transverse direction outer side around the right side hinge portion 82CR. Due thereto, this region abuts the armrest 36A. Due thereto, at the time of expansion of the side airbag 50, the space between the airbag door 82 and the door trim 36 is blocked by the door portion 82AD, and the side airbag 50 entering into this space can be suppressed. Other operations are similar to those of the first embodiment.

Although a first embodiment through a third embodiment of the present disclosure have been described above, the gist of the present disclosure can, of course, be implemented in various forms within a scope that does not depart therefrom. For example, in the above-described embodiments, as shown in FIG. 3, the distal end of the door portion 42AD planarly-contacts the armrest 36A in the state in which the door portion 42AD is open. However, the present disclosure is not limited to this. A structure in which a door portion, whose length is shorter than the door portion 42AD of FIG. 3, is formed may be employed. In this case, the door portion enters into the space 60 between the airbag door 42 and the door trim 36, but, due to the distal end of the door portion abutting the armrest 36A and blocking a portion of the space 60, the side airbag 50 entering into the space 60 can be suppressed.

Further, in the above-described embodiments, a portion (the lower portion) of the side airbag 50 is disposed further toward the vehicle lower side than the top surface of the armrest 36A, but the present disclosure is not limited to this. For example, there may be a structure in which the entire side airbag 50 is disposed further toward the vehicle lower side than the top surface of the armrest 36A.

Moreover, in the second embodiment, as shown in FIG. 4, the reverse-opening door portion 72AR is provided only at further toward the vehicle upper side than the top surface of the armrest 36A, but the present disclosure is not limited to this. For example, even in a case in which the lower end portion of the reverse-opening door portion 72AR is positioned in a vicinity of the top surface of the armrest 36A, it suffices for the majority of the reverse-opening door portion 72AR to be positioned further toward the vehicle upper side than the top surface of the armrest 36A.

Further, in the second embodiment, the door portion 72AD is sectioned into an upper portion and a lower portion by the inclined tear portion 72BS, but the present disclosure is not limited to this. For example, a tear portion that extends along the vehicle transverse direction may be employed instead of the inclined tear portion 72BS.

What is claimed is:

1. A side airbag device for a rear seat, comprising:
   a side airbag that is provided between a vehicle body and a side portion of a seatback of a rear seat, the side airbag being configured such that at least a portion of the side airbag is disposed further toward a vehicle lower side than a top surface of an armrest, and the side airbag is expanded at a side of a passenger at a time of a collision; and
   an airbag door garnish that covers the side airbag from a vehicle cabin side, and that has a door portion that, due to inflation pressure of the side airbag, opens toward a vehicle front side and a vehicle transverse direction outer side and abuts the armrest.

2. The side airbag device for a rear seat of claim 1, wherein the door portion is configured to include a reverse-opening door portion that opens toward the vehicle front side and a vehicle transverse direction inner side due to inflation pressure of the side airbag.

3. The side airbag device for a rear seat of claim 2, wherein the reverse-opening door portion is provided further toward a vehicle upper side than the top surface of the armrest.

4. The side airbag device for a rear seat of claim 2, wherein the reverse-opening door portion is provided further toward the vehicle transverse direction inner side than the armrest.

5. The side airbag device for a rear seat of claim 1, wherein at least a portion of the door portion is provided at a position that, as seen in a vehicle front view, overlaps a webbing that is in a non-applied state.

6. The side airbag device for a rear seat of claim 1, wherein:

the side airbag is accommodated in a case together with an inflator that supplies gas to the side airbag, the case has a bottom wall that supports, from a vehicle rear side, the side airbag that is in an expanded state, and an inclined surface, that is inclined toward a vehicle front side on progression toward a vehicle lower side with respect to a general portion of the bottom wall, is formed at the bottom wall further toward a vehicle lower side than the top surface of the armrest.

* * * * *